US012710336B2

(12) United States Patent
Furze et al.

(10) Patent No.: US 12,710,336 B2
(45) Date of Patent: Aug. 18, 2026

(54) METHOD AND SYSTEM FOR CHARACTERIZING AND ANALYZING AERODYNAMICS OF GOLF EQUIPMENT

(71) Applicant: Acushnet Company, Fairhaven, MA (US)

(72) Inventors: Paul Furze, Tiverton, RI (US); Courtney N. Engle, Fall River, MA (US); Jordan R. Tate, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 278 days.

(21) Appl. No.: 18/407,833

(22) Filed: Jan. 9, 2024

(65) Prior Publication Data

US 2024/0230460 A1 Jul. 11, 2024

Related U.S. Application Data

(60) Provisional application No. 63/479,395, filed on Jan. 11, 2023.

(51) Int. Cl.
*G01M 9/06* (2006.01)
*G01M 9/04* (2006.01)

(52) U.S. Cl.
CPC .............. *G01M 9/067* (2013.01); *G01M 9/04* (2013.01)

(58) Field of Classification Search
CPC ................................ G01M 9/067; G01M 9/04
See application file for complete search history.

(56) References Cited

U.S. PATENT DOCUMENTS 6,891,980 B2 * 5/2005 Gerhard ............... G01N 21/455 382/312
2005/0276907 A1 * 12/2005 Harris .................. G01N 21/951 427/8
2019/0184229 A1 * 6/2019 Zhdanov ............... H04N 23/21

FOREIGN PATENT DOCUMENTS

AU 2005312926 A1 * 6/2006 ................ G01P 3/68
RU 2339023 C2 * 11/2008

OTHER PUBLICATIONS

AU-2005312926-A1, English Translation (Year: 2006).*
RU-2339023-C2, English Translation (Year: 2008).*
"Schlieren Optics" Harvard Natural Sciences Lecture Demonstrations; Website: <https://sciencedemonstrations.fas.harvard.edu/presentations/schlieren-optics>; (Oct. 2015) (5 Pages).

(Continued)

*Primary Examiner* — Ryan D Walsh
(74) *Attorney, Agent, or Firm* — Thomas P. Gushue

(57) ABSTRACT

A method of analyzing and characterizing aerodynamic characteristics of a golf ball is disclosed. The method involves utilizing a schlieren system to observe, study, and capture aerodynamic related information of a golf ball, particularly at subsonic speeds. Due to the inherent operating principals of schlieren systems, the present disclosure includes a treatment of the golf ball prior to or during analysis within the schlieren system. For example, the method can include applying a refractive index altering treatment to the golf ball. The treatment to the golf ball results in a non-homogenous density-altering effect being emitted from the golf ball such that quantitative and qualitative aerodynamic information can be captured by the schlieren system.

25 Claims, 14 Drawing Sheets

(56) References Cited

OTHER PUBLICATIONS

"Schlieren Visualization" Schmidt <https://shepherd.caltech.edu/T5/Ae104/Ae104b_handout2015.pdf> (2015) (9 pages).

"Schlieren Imaging System" Holmarc; <https://holmarc.com/schlieren_imaging_system.php>; (2022) (6 pages).

"Background-oriented schlieren (BOS) techniques" Raffel; <https://link.springer.com/article/10.1007/s00348-015-1927-5>; (2015) (70 Pages).

"2D & Stereo PIV" LaVision; <https://www.smart-piv.com/en/products/flowmaster/2d-stereo-piv/>; (2022) (10 Pages).

"FlowMaster Tomographic PIV" LaVision; <https://www.lavision.de/en/products/flowmaster/tomographic-piv/>; (2017) (9 Pages).

"Laminar Express: Using Baseball Science to Enhance Two-Seam Fastballs" Driveline Baseball; <https://www.drivelinebaseball.com/2019/01/laminar-express-baseball-science-behind-the-two-seam-fastball/>; (Jan. 2019) (13 Pages).

"Schlieren Imaging" MIT; <http://www.mit.edu/~milesdai/projects/schlieren/index.html> (2018) (11 Pages).

* cited by examiner

100

135
140
155
156
145
115
115c
115b
150
110
120
130
115a
126
125
152
102
127

METHOD AND SYSTEM FOR CHARACTERIZING AND ANALYZING AERODYNAMICS OF GOLF EQUIPMENT

INCORPORATION BY REFERENCE

The present application claims the benefit of U.S. Provisional Patent Application No. 63/479,395, filed on Jan. 11, 2023, the entire disclosure of which is hereby incorporated herein by reference.

FIELD OF THE INVENTION

This disclosure generally relates to a method and a system for characterizing and analyzing aerodynamics of golf equipment, and more particularly relates to a schlieren system for characterizing and analyzing aerodynamics of a golf ball.

BACKGROUND OF THE INVENTION

It is generally well known that improving the aerodynamics of a golf ball is advantageous for multiple reasons, such as improving the flight path, trajectory, speed, and/or distance of a golf ball. Analysis of golf ball aerodynamics can be difficult due to the complex nature of a golf ball's turbulent structures, which are directly impacted by the dimple pattern on the golf ball.

There are known aerodynamic analytical techniques that rely on computational fluid dynamics analysis. These known techniques are not fully able to realize the flow field of air traveling past a dimpled golf ball with high accuracy and detail due to the variations in turbulent structure profiles as well as rotation of the golf ball, which makes utilizing these techniques to conduct meaningful and reliable analysis difficult.

One specific area of focus for improving golf ball design involves flow visualization of the wake of the golf ball, which is the relatively low-pressure region behind the golf ball with highly turbulent structures caused by air separation from the golf ball surface. It is well known that golf ball dimples improve aerodynamic performance by delaying this separation and ultimately decreasing the wake by introducing micro-vortices into the boundary layer of the flow. However, increasing the small-scale turbulence beyond a certain threshold can negatively impact aerodynamic performance. Accordingly, there is a need in the industry for finding an optimized turbulence level, which is generally addressed by conducting experimental testing on golf balls.

It would be desirable to provide an improved aerodynamics analysis technique that provides both quantitative and qualitative data regarding the turbulent airflow around a rotating golf ball.

SUMMARY OF THE INVENTION

In some embodiments, the present disclosure provides an improved technique for analyzing the aerodynamic properties of a golf ball. The techniques disclosed herein can be adjusted or modified to analyze, visualize, or otherwise examine various properties of airflow relative to a golf ball.

According to one aspect, a method of characterizing and analyzing aerodynamic characteristics of a golf ball is disclosed that comprises: (i) applying a refractive index altering treatment to a golf ball such that a non-homogenous density-altering effect is emitted from the golf ball; and (ii) characterizing and analyzing aerodynamic characteristics of the golf ball via a schlieren system. Due to the air speeds relative to a golf ball being subsonic (i.e., either the ball is launched at subsonic speeds or the air directed to the golf ball is at subsonic speeds), step (i) provides a reliable solution for generating a refractive variant that is sufficient to be detectable using a schlieren system.

The step of applying the refractive index altering treatment to the golf ball can comprise applying a heat treatment to the golf ball. The heat treatment can be applied to the golf ball immediately prior to the analysis in the schlieren system, in one aspect. In another aspect, the heat treatment can be applied to the golf ball simultaneously with the image collection step involving the schlieren system. The step of applying the refractive index altering treatment to the golf ball can comprise heating the golf ball in a heating unit, such as an oven. The heat treatment can comprise directing a heating element towards a narrow region localized around a great circle of the golf ball to heat the golf ball. The localized great circle region of the golf ball can be defined in a plane that is parallel to a direction of airflow provided by the schlieren system, and more specifically can be defined in a plane that is: (i) parallel to the direction of airflow, (ii) parallel to a viewing plane, and/or (iii) parallel to a mirror of the schlieren system. One of ordinary skill in the art would understand that the plane of the localized great circle region can vary depending on particular configurations of a specific schlieren system.

In another aspect, heat treatment is not required, and instead the step of applying the refractive index altering treatment to the golf ball comprises providing a fluid dispersion assembly for the golf ball. The fluid dispersion assembly can be arranged around a great circle of the golf ball, such as the equator of the golf ball. The fluid dispersion assembly can be configured to disperse at least one of helium, hydrogen, heated air, or alcohol. One of ordinary skill in the art would understand that various other types of gases or liquids could be used. Additionally, any combination of liquids or gases could be used. Various types of structures for the fluid dispersion assemblies could be attached to the golf ball or integrated within the golf ball.

Relative movement between air and the golf ball can be achieved according to a variety of ways. For example, the golf ball can be held at a fixed point in one configuration while an airflow is directed towards the golf ball, such as by a fan or air blowing unit. In another example, the golf ball can be launched via a launching device or launch assembly. In either configuration, the aerodynamic characteristics can be studied at subsonic velocities.

The method can comprise mounting the golf ball to an end of a support extending into a wind tunnel having a test section passing through the field of view of the schlieren imaging area and being configured to direct laminarized air at subsonic speeds towards the golf ball.

The support for the golf ball can comprise a shaft that is configured to rotate the golf ball. The support can be embodied as any type of structure capable of holding the golf ball in position within a wind tunnel. The support can extend cantilevered from a surface inside or outside of the wind tunnel. The support can be braced on opposing sides of the golf ball.

A motor can be connected to the shaft and the motor can control at least one type of motion of the golf ball. For example, the motor can be configured to provide a rotational movement to the golf ball. In one aspect, the motor configured to rotate the golf ball can have a variable controller or setting, and the motor or power source for controlling the air flow generator can likewise have a variable controller or setting. In one aspect, the rotational speed of the golf ball and the speed of the air flow can be variably adjusted in unison to mimic a golf ball's flight for a variety of conditions and for a variety of strikes by different golf clubs. A common controller or interface can be provided between the two respective motors or power sources to synchronize the relevant settings.

The support can comprise a heating element that is configured to heat at least a portion of the golf ball. The heating element can include an electrical heating unit and can extend within the support.

The schlieren system can comprise a variety of components and can be embodied according to a variety of configurations. In one aspect, the schlieren system comprises at least one camera, at least one light source, at least one mirror, at least one knife edge, and at least one of: a device or system to direct air at the golf ball or a golf ball launcher. Any one or more of these components can be modified. In one aspect, the mirror can be a normal mirror. In another aspect, the mirror can be a half-silvered mirror, one-way mirror, or semi-transparent mirror. Furthermore, any one or more other components can be duplicated or other components can be included for the schlieren system. For example, electronic hardware and software components can be provided to store, process, analyze, and manipulate the images or data captured by the camera. Additionally, a monitor, screen, or display can be provided that is configured to display the image data captured by the camera. A user interface can be provided that is configured to allow a user to manipulate various aspects of the system. For example, the user interface can be configured to adjust the power or speeds of rotation of the golf ball or the air flow generator, or the temperature of any heating element of the golf ball.

According to another aspect, a method of analyzing aerodynamic characteristics of a golf ball is disclosed that comprises applying a refractive index altering treatment to a golf ball via at least one of: applying a heat treatment to the golf ball, or providing a fluid dispersion assembly to the golf ball, such that a non-homogenous density-altering effect is emitted from the golf ball. The method further comprises either: launching the golf ball through a schlieren system, or supporting the golf ball via at least one support while the golf ball is positioned within a wind tunnel of a schlieren system. The method further comprises analyzing aerodynamic characteristics of the golf ball based on visual data obtained from the schlieren system. The visual data can be obtained via a camera, such as a high-speed camera.

In another aspect, the present disclosure is also directed to a method and arrangement for analyzing the aerodynamics of a golf related object or golf equipment other than a golf ball. For example, golf clubs can be analyzed using the techniques disclosed herein to provide qualitative and quantitative aerodynamic data. As used in this context, the term golf club refers to all types of golf clubs, such as irons, woods, drivers, fairway clubs, hybrid clubs, putters, etc.

According to another aspect, an aerodynamic analysis assembly is provided herein. The aerodynamic analysis assembly can generally include a subsonic schlieren visualization system as well as another assembly that is configured to generate air flow relative to an object, such as golf equipment. This assembly can include a wind tunnel having a support to hold the object, or can include a launching device configured to launch the object to generate a predetermined air flow relative to the object. An additional component, such as a heating component or fluid dispersion component, can be provided to apply a refractive index altering treatment to the object.

Various other aspects and features of the method of analyzing aerodynamic features of a golf ball, as well as a schlieren system itself, are disclosed herein.

BRIEF DESCRIPTION OF THE DRAWINGS

Further features and advantages of the present disclosure can be ascertained from the following detailed description that is provided in connection with the drawings described below.

DETAILED DESCRIPTION OF THE INVENTION

Figure 1A:
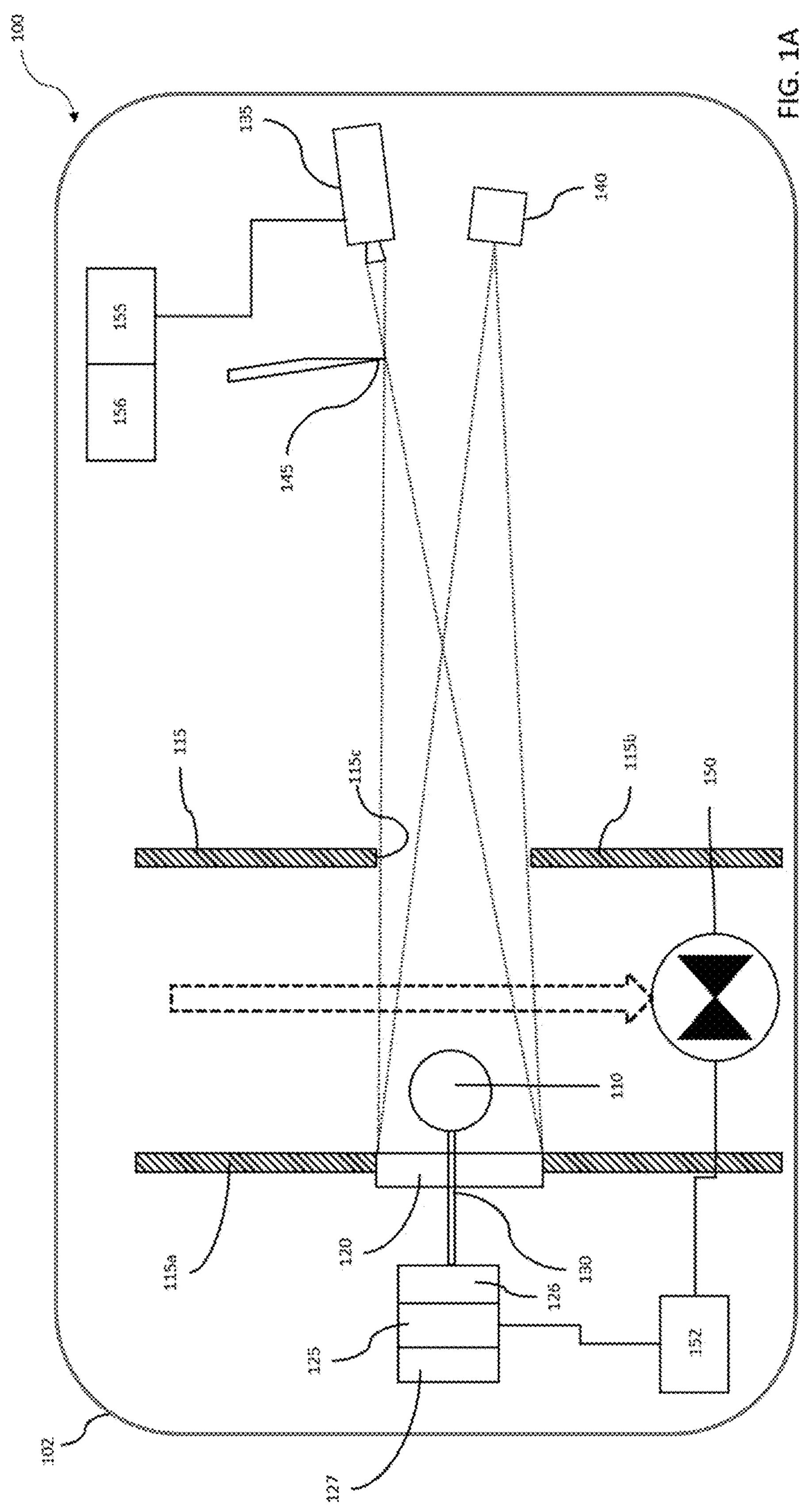
FIG. 1A is a schematic illustration of a golf ball aerodynamic analysis assembly according to one aspect.

According to some of the disclosed embodiments, a method and a system for characterizing and analyzing the aerodynamics of a golf ball are provided herein. The present disclosure provides arrangements and configurations for characterizing and analyzing aerodynamics of a golf ball using a schlieren system, in one aspect.

Although specific configurations, designs, or orientations of schlieren systems are disclosed herein for analyzing golf ball aerodynamics, one of ordinary skill in the art would understand that other imaging techniques could be used or adopted based on the principles disclosed herein that may or may not include features of that are typically employed by a schlieren system. Variations of a shadowgraph system or configuration can be used to provide images showing aerodynamic characteristics of the golf ball.

The specific arrangement of the schlieren system can be modified, as one of ordinary skill in the art would appreciate based on this disclosure. In one aspect, the present disclosure provides an arrangement in which the aerodynamics of a golf ball can be analyzed at a subsonic velocity, i.e., where the golf ball is launched at a subsonic velocity or where a device or system directs air (i.e., an air flow generator) at a subsonic velocity towards a golf ball held at a fixed point. Sonic or hypersonic speeds are not required to analyze the golf balls. In one aspect, this arrangement provides a more detailed and characterized visualization of the aerodynamics experienced by golf balls during ordinary use by golfers.

The present disclosure provides a solution for providing both quantitative and qualitative information regarding the aerodynamic performance or characteristics of a golf ball. For example, the visual data or information captured by a camera according to the present disclosure can be further analyzed or processed via a computer, processor, or other computational element to provide quantitative or numerical aerodynamic information. Additionally, qualitative information is provided by the configuration described in the present disclosure. In one example, multiple images showing two different golf balls can be arranged relative to one another such that comparative analysis can be performed based on the visual characteristics shown in the images. A monitor or display can be configured to display two different images or sets of images related to the aerodynamic characteristics of a golf ball. Visualization software or image processing techniques, modules, elements, etc., can be used to further analyze the turbulent flow of air relative to the golf balls. The images acquired can be used in conjunction with computational fluid dynamics software or a computational fluid dynamics module to further detail the aerodynamic behaviors of the flow. The computational fluid dynamics software can include any known system or configuration, such as known commercially available software, open-source computational fluid dynamics software, and/or a customized computational fluid dynamics software package. The boundaries of interior cells, exterior cells, or both may take dynamic input and output information derived from the schlieren images. One of ordinary skill in the art would understand that the software or module can be implemented on a computer, processor, or other electronic computing component. The present disclosure therefore provides a versatile solution for analyzing various aerodynamic features of golf balls.

Various configurations for the schlieren system can be utilized, as described in the present disclosure. One of ordinary skill in the art would understand that various aspects of the specific schlieren setup can vary depending on the requirements of a specific golf ball analysis application.

In one aspect, a method of characterizing and analyzing aerodynamic characteristics of a golf ball is disclosed. The method can include: (i) providing a schlieren system, (ii) applying a characteristic altering treatment to a golf ball, and (iii) characterizing and analyzing aerodynamic characteristics of the golf ball via the schlieren system based on the altered characteristic of the golf ball. In one aspect, the method can include fewer or more steps than steps (i)-(iii). One of ordinary skill in the art would understand based on this disclosure that any one of the steps can be modified, supplemented, or omitted.

The present disclosure avoids supersonic motion requirements for visual contrast imaging by altering a characteristic of the golf ball. As used in this context, the term altering a characteristic of the golf ball can include heating the golf ball above an ambient temperature. For example, the golf ball can be heated to two to six times the ambient temperature. In one aspect, the golf ball is heated to a predetermined temperature of at least 250° F. for 5 minutes. In one example, the golf ball is heated at a predetermined temperature of at least 250° F. for at least 5-10 minutes. In one example, the golf ball is heated to at least 300° F. for 5 minutes. In another example, the golf ball is heated to at least 350° F. for 5 minutes. In one example, the golf ball is heated until its outer surface in at least one region has reached 350° F.-450° F. The predetermined temperature accounts for possible heat losses incurred after application of the heat treatment and before image capture. One of ordinary skill in the art would understand that the predetermined temperature can vary and can further differ for different environments due to ambient temperature, humidity, and other factors including relative air speed. One of ordinary skill in the art would also understand that the predetermined temperature can vary with different golf ball constructions and/or model assemblies, including the use of non-traditional materials (e.g., a metallic center) to enhance the thermal conductivity of the sample.

In another aspect, the step of altering a characteristic of the golf ball can include modifying or altering the golf ball such that a fluid is emitted from the golf ball during the analysis. For example, a fluid-containing jacket, sleeve, conduit, or other element can be attached or integrated with the golf ball. In another aspect, the ambient temperature, such as the temperature within a wind tunnel or the temperature of the air through which a golf ball is launched, can be heated to provide a refractive index variation sufficient for the aerodynamics of the golf ball to be analyzed. In another configuration, the air within the wind tunnel or the ambient air through which a golf ball is being launched can be cooled, and the golf ball can be heated to provide a greater image contrast or gradient. A porous cover could be provided around the golf ball or a golf ball core, in one example. The porous cover can be formed from sintered metal, for example. Dimples can be provided on the sintered metal via a milling machine, for example. In another configuration, the golf ball can be cooled and the ambient air within the testing apparatus or system can be heated such that a sufficient temperature differential is generated to provide a refractive index that can be visualized using the principles disclosed herein.

The method disclosed herein can include applying a refractive index altering treatment to a golf ball such that a non-homogenous density-altering effect is emitted from the golf ball. As used in this context, the term non-homogenous density altering effect refers to an effect that is detectable by the schlieren system based on the ambient air surrounding the golf ball undergoing some type of alteration. The otherwise homogenous ambient air that surrounds the golf ball is intentionally altered in such a way that the change in refractive index surrounding the golf ball is detectable by the schlieren system such that the image data captured by the camera provides clear aerodynamic patterns, features, and related imagery for further analysis. In one aspect, the refractive index altering treatment can alter the refractive index by at least 0.1%, or at least 0.01%, or at least 0.001%, or 0.0005%.

One of ordinary skill in the art would recognize based on the present disclosure that other treatments could be applied to a golf ball such that the aerodynamics of the golf ball can be analyzed using a schlieren system, not limited to but including background-oriented schlieren (BOS).

In one configuration, a heating element can be directed towards a predetermined region of the golf ball. For example, the predetermined region could include a great circle of the golf ball, which can be coincident with or orthogonal to the parting line of the golf ball. The golf ball can be heated in an oven, in one example. The oven can be configured to heat multiple golf balls at once such that multiple golf balls receive an identical heat treatment prior to analysis.

The golf ball can be modified via attaching, connecting, or otherwise linking a fluid dispersion assembly onto the golf ball. In one example, the fluid dispersion assembly is arranged around a predetermined region of the golf ball, such as an equatorial region of the golf ball or around a great circle of the golf ball.

The fluid dispersion assembly can be configured to release any fluid having different characteristics than the ambient air surrounding the golf ball. In one example, the fluid can include at least one of helium, hydrogen, heated air, or alcohol. One of ordinary skill in the art would understand that the specific fluid can vary. In one aspect, heated fluid is used. In another aspect, cooled fluid is used.

To provide relative movement between the golf ball and the surrounding air, various techniques can be used. For example, the golf ball can be launched through a test area of the schlieren system to characterize and analyze the aerodynamic characteristics of the golf ball. In one example, the golf ball is launched at a subsonic velocity. The golf ball does not need to be launched at a supersonic velocity due to the characteristic altering treatment that is used on the golf ball. In one aspect, the relative speed can be at sonic velocity or less than sonic velocity.

In another example, the golf ball is mounted on a support that extends at least partially within a test area of the housing or schlieren system. The support can be formed as a shaft, in one example. One of ordinary skill in the art would understand that various ball supporting structures could be used to hold the golf ball stationary in a testing area of the schlieren system.

The golf ball can be mounted within a wind tunnel of the schlieren system such that an equatorial region of the golf ball is arranged parallel to a device or system that is configured to direct air towards the golf ball at a subsonic velocity. The air can be laminarized. In one example, the support comprises a shaft that is configured to rotate the golf ball. The shaft can extend through a center of the golf ball. The support can comprise a heating element that is configured to heat at least a portion of the golf ball. The heating element can be configured to wrap around the golf ball, or extend around a circumference of the golf ball. The support can comprise a system to deliver fluid to the golf ball.

One of ordinary skill in the art would understand that the schlieren system can include various components, such as at least one camera, at least one light source, at least one mirror, at least one knife edge or color filter, and at least one of a device or system to direct air towards the golf ball or a golf ball launcher. A system comprising a golf ball launcher may optionally include a wind screen or other device to minimize the effect of the launcher on the ambient air movement.

Another method of characterizing and analyzing aerodynamic characteristics of a golf ball is also disclosed herein. The method can comprise providing a schlieren system comprising at least one camera. The method further comprises applying a characteristic altering treatment to a golf ball via at least one of: applying a heat treatment to the golf ball, or providing a fluid dispersion assembly to the golf ball, such that a non-homogenous density variation emanates from the golf ball. Other "modification" treatments can be used on the golf ball. The method also comprises at least one of: launching the golf ball through the field of view of the schlieren system, or holding the golf ball at a fixed point in the field of view of the schlieren system via at least one support while the golf ball is supported within a wind tunnel. In either case the golf ball can also be rotating. The method further comprises analyzing aerodynamic characteristics of the golf ball via the schlieren system based on visual data obtained via the at least one camera.

Referring to the Figures, a first golf ball aerodynamic analysis assembly 100 (herein "assembly 100") is shown in FIG. 1A. The assembly 100 can generally comprise a wind tunnel 115 in which a golf ball 110 is supported. The test section, i.e., the section of the wind tunnel in which the golf ball is supported, can have a square or rectangular cross section and can be at least one foot tall and at least one foot wide and can have a length of at least two feet. In another aspect, the wind tunnel 115 can have a circular or cylindrical cross section. The wind tunnel may have one or more sections to laminarize the airflow. One of the walls 115*b* of the wind tunnel 115 can include a window 115*c*. The wind tunnel can be an open circuit tunnel or a closed circuit tunnel. An opposing wall 115*a* of the wind tunnel 115 can support a mirror 120. One of ordinary skill in the art would understand that the mirror 120 can be arranged away from the wall 115*a*. The mirror 120 can be approximately 6.0 inches-10.0 inches in diameter, in one example. One of ordinary skill in the art would understand that the size of the mirror 120 can vary. The mirror 120 can be a spherical mirror. The mirror 120 can be flush with the wall 115*a* of the wind tunnel to minimize air flow disruption. The mirror 120 can have an opening to allow for passage of a support of the golf ball, in one aspect. An opening or hole in the mirror 120 for accommodating or receiving a support 130 can be offset from a center of the mirror 120 such that the wake of the golf ball is approximately centered. The mirror 120 can be supported in an isolated manner such that any vibrations from the wind tunnel 115 or the support 130 do not disturb or vibrate the mirror 120.

An air flow generator 150 (i.e., fan) can be arranged to direct forced air inside of the wind tunnel 115. In one aspect, the air flow generator 150 is configured to provide air speeds at the golf ball 110 of approximately 50 mph-200 mph, or 50 mph-300 mph, or 100 mph-300 mph. The power or output of the air flow generator 150 as well as the relative positioning of the air flow generator 150 can be adjusted to provide a predetermined air flow relative to the golf ball 110. As shown in FIG. 1A, the air flow generator 150 can be configured to pull air towards the golf ball 110, in one aspect. In another aspect, the air flow generator 150 can be configured to push or blow air towards the golf ball 110. One of ordinary skill in the art would understand that the exact position of the air flow generator 150 can vary depending on the specific configuration of a wind tunnel or other housing element.

The golf ball 110 can be supported within the wind tunnel 115 according to a variety of configurations. In one example, the support 130 extends at least partially inside of the wind tunnel 115. The support 130 can be configured to extend through an opening of the mirror 120. The support 130 can be configured to additionally extend through an opening on the side of the test section opposing the mirror. The support 130 can be solid or hollow. The support 130 can have a cross-sectional shape of any of the following but is not limited to: circular, square, regular polygonal, elliptical, or similar.

The diameter of a support having a non-circular cross-section is defined by an equivalent diameter de given by $$d_e = 2\sqrt{\frac{A}{\pi}}$$

where A is the cross-sectional area of the support. The support 130 may have a nonuniform cross-sectional area over its length.

The support 130 can be formed according to a variety of configurations. In one aspect, the support 130 can have a cross section of approximately 0.0625", or 0.10", or 0.25". In one aspect, the support 130 has a cross-section that is less than the diameter of the golf ball 110. Connecting the support 130 to the golf ball 110 can be achieved according to a variety of configurations. In one aspect, an adhesion feature can be provided for attaching the support 130 to the golf ball 110. For example, a hole can be drilled through a center of the golf ball 110 such that the hole is dimensioned to receive a portion or an end of the support 130. Adhesive can be applied to the end of the support 130 that extends within the hole of the golf ball 110. In another example, a mechanical fastener can be provided. The support 130 can be configured to pass through a hole in the center of the golf ball 110 and an end of the support 130 can be permanently deformed such that the support 130 is fixed with the golf ball 110. In another configuration, an interference fit can be provided between the golf ball 110 and the support 130. For example, a hole can be provided on the golf ball 110 that is the same shape as a cross-section defined by the end of the support 130. Pressing the golf ball 110 onto the end of the support 130 provides an interference fit between the golf ball 110 and the support 130 to maintain the golf ball 110 in position. In another configuration, a compression fit can be provided between the golf ball 110 and the support 130. The golf ball 110 can be compressed on either side by flanges that will ensure the golf ball 110 does not slide and instead rotates with the support 130. In yet another configuration, during formation of the golf ball 110, an end or portion of the support 130 can be placed in the mold for the golf ball 110 such that the golf ball 110 is fixed in position with the support 130 during core molding. An end of the support 130 can include a rotating member, as well as a bearing or other rotational support, that is configured to rotationally drive the golf ball 110. The support 130 can have a secondary internal shaft or support, which can rotate relative to the support 130 and provide a rotational input to the golf ball 110.

The support 130 can be configured to allow for a heating element or component to extend therein. A heater 125 can be provided that is connected to the golf ball 110, such that the heater 125 can heat the golf ball 110 to a predetermined temperature. The heater 125 can be formed integrally with the heater, and the support 130 can be configured to generate heat such that the golf ball 110 is heated from the inside, for example when the support 130 is formed integrally with the golf ball 110. The support 130 may also be configured to deliver fluid to the golf ball.

A motor 126 can also be provided that is configured to rotate the support 130. The rotational speed of the motor 126 can be adjustable. The motor 126 can be an AC or DC variable speed motor. Additionally, other modes of operation of the motor 126 can be adjusted. For example, the motor 126 can be configured to displace the support 130. The motor 126 can rotate the golf ball at 2,000 rpm-3,000 rpm, in one example. In another example, the golf ball can be rotated at 1,000 rpm-10,000 rpm. The golf ball 110 can be configured to spin counterclockwise as viewed by an image capturing device or camera 135. Referring to FIG. 1A, the golf ball 110 can be rotated such that the top surface of the golf ball 110 is moving in the same direction as the air flow (indicated by the dashed arrow). One of ordinary skill in the art would understand that other rotational inputs could be provided to the golf ball 110 and in different directions.

In one configuration, the golf ball 110 is rotated while air is directed towards the golf ball 110. In another configuration, the golf ball 110 is held stationary and does not rotate while air is directed towards the golf ball 110. In yet another configuration, the golf ball 110 can be supported such that the air directed towards the golf ball 110 causes rotational movement of the supported golf ball 110.

In one configuration, the heater 125 and the motor 126 can be powered by a common power source or battery 127. This configuration provides a more convenient packaging of the overall assembly 100 in that the components are self-contained and powered via an internal power source. In one example, electrical current can be supplied to the heater 125, which can be configured to rotate with the golf ball 110, via a stationary power source. One of ordinary skill in the art would understand that a slip ring, or other component can be used to allow for a connection between a stationary and rotating component of the assembly.

In one configuration, a light source 140 is provided for directing light towards the mirror 120 and back towards a camera 135. The light source 140 is configured to direct light towards the wind tunnel and the golf ball 110. The light source 140 can be a point source. In one aspect, the light source 140 is relatively small, and can be 0.010" in diameter.

A camera 135 is arranged such that a lens of the camera 135 is directed towards the wind tunnel 115 and the golf ball 110. In one example, the camera 135 is a digital high-speed camera. In one example, the camera 135 can be configured to capture still images of the golf ball. In one example, the camera 135 can be a camera having a frame rate of twenty frames per second and a resolution of two megapixels (MP). In one configuration, the light source 140 can be strobed. In another configuration, video can be captured via the camera 135. In one example, a digital camera having a frame rate of 4,000 frames per second and a shutter time of 25 microseconds can be used. One of ordinary skill in the art would understand based on this disclosure that a shorter shutter time can be used, but other variables such as intensity of the light may need to be adjusted. Additionally, a higher frame rate can be used. In one example, the frame rate is at least 3,000 frames per second.

The camera 135 can be configured with a focus at infinity and the aperture open to its maximum size. Moving the camera 135 closer to the mirror 120 generally makes the image smaller, while moving the camera 135 further from the mirror 120 generally makes the image larger. The distance is set so that the desired image fills the field of view. The camera exposure E can be determined by:

$$E = \frac{B}{v}$$

where B is the acceptable motion blur. In one aspect, the acceptable motion blur is 0.0625 inches. In another aspect, the acceptable motion blur is 0.0313 inches. In one aspect, the acceptable motion blur is 0.050-0.075 inches. In one aspect, the acceptable motion blur is 0.025-0.095 inches.

A knife edge 145 is also provided in proximity to the camera 135. The knife edge 145 can include a razor blade edge or other type of light blocking component with a sharp edge. The knife edge 145 can have a thickness of 0.005" to 0.010". The knife edge 145 can be configured to be at the focal point of the mirror 120. The knife edge 145 is configured to block light that is displaced by the change in refractive index. The position of the knife edge 145 can be adjusted using an X-Y stage, in one example.

In one aspect, various color filters can be incorporated into the assembly 100, such as a monochromatic or binary color filter. In one aspect, a color filter can be positioned such that its edge is in the same or a similar position as the knife edge 145. In another configuration, two color filters can be used. In one configuration, two color filters can be arranged in a juxtaposed configuration such that an interface or seam between the two color filters is in the position of the knife edge 145. When using two filters, high contrasting colors can be used. In another example, moderately contrasting colors can be used for the color filters. In one example, a colored filter including one red filter and one blue filter arranged on opposite sides of a focal point can be used. One of ordinary skill in the art would understand based on this disclosure that other exemplary contrasting color profiles and configurations could be used.

A monitor or screen 155 can also be provided that is configured to display images captured by the camera 135. One of ordinary skill in the art would understand that a user interface, such as a mouse, keyboard, or other controls can be connected to the monitor 155. The user interface can be configured to allow a user to manipulate data captured via the camera 135 or otherwise interact with features of the schlieren system. Images from the camera 135 can be superimposed on top of one another, in one configuration.

A computer, central processing unit (CPU), or other electronic component 156 can also be provided. The computer 156 can be connected to the monitor 155, the camera 135, and the light source 140. The connections or interfaces between the computer 156, monitor 155, and the camera 135 can be direct, indirect, wireless, wired, etc.

In one configuration, a metal dimpled sphere with a matching dimple pattern as a golf ball can be used in place of the golf ball. The metal dimpled sphere can be configured to withstand higher temperatures than the golf ball, which can allow for greater visualization of the air flow due to a higher temperature variant. The metal dimpled sphere can have an identical dimple pattern as the golf ball. In another configuration, an undimpled metal sphere may be covered in a non-metallic cover such as a thermoset urethane resin, the process for which imparts a dimpled pattern into the cover and forms a piece that represents a golf ball with a metallic center. In a further embodiment, the covered metallic core is additionally painted using paint formulations known to one of ordinary skill in the art. In one aspect, non-conforming golf ball models or representations of golf balls, that include aerodynamic features, i.e., dimple patterns, can be used within the systems and methods disclosed herein. The term golf ball, can refer to any finished golf ball, or any of the aforementioned constructions or embodiments.

As shown in FIG. 1A, the assembly 100 can be enclosed within a housing 102. The housing 102 can be portable and can be a free-standing assembly. The assembly 100 can be provided as a modular configuration in which various subcomponents of the assembly 100 can be interchanged, installed, removed, etc. The assembly 100 can be disassembled and reassembled for transportation purposes. The housing 102 can include wheels, in one example, such that the entire assembly 100 can be easily maneuvered. In one aspect, the assembly 100 is mobile and self-contained, such that the entire assembly 100 can be positioned in a variety of locations (such as trade shows, expositions, or demonstrations) without requiring any supports, external power sources or any other external resources. The housing 102 can enclose all or a majority of the components of the schlieren system. The assembly 100 and the housing 102 can be oriented in a vertical direction or can be oriented in a horizontal direction. One of ordinary skill in the art would understand that the orientation of the assembly 100 (or assembly 200) can be modified such that the air is directed in any direction towards the golf ball or the golf ball is launched in any direction. Ventilation can be provided on the housing 102, such as on an oppositely facing wall from the device or system to direct air at the golf ball 110. The assembly 100 is configured to produce air speeds up to sonic levels, in one aspect. The assembly 100 can produce air speeds of up to 200 mph in another aspect.

Various aspects or variables of the assembly 100 can be adjusted. In one configuration, air is directed towards the golf ball or the golf ball is launched at 50 mph-200 mph. In another aspect, air is directed towards the golf ball or the golf ball is launched at 100 mph-175 mph. In another aspect, air is directed towards the golf ball or the golf ball is launched at 125 mph-200 mph. One of ordinary skill in the art would understand that the relative speed of the air within the wind tunnel or the launching of the golf ball can vary depending on particular requirements of a system.

At least a portion of the golf ball can be heated to at least 350° F. The golf ball can be heated to 150° F.-450° F., in another aspect. In one configuration, the golf balls are heated to the highest temperature that is tolerable without materials on or within the golf ball undergoing melting or permanent damage.

Figure 1B:
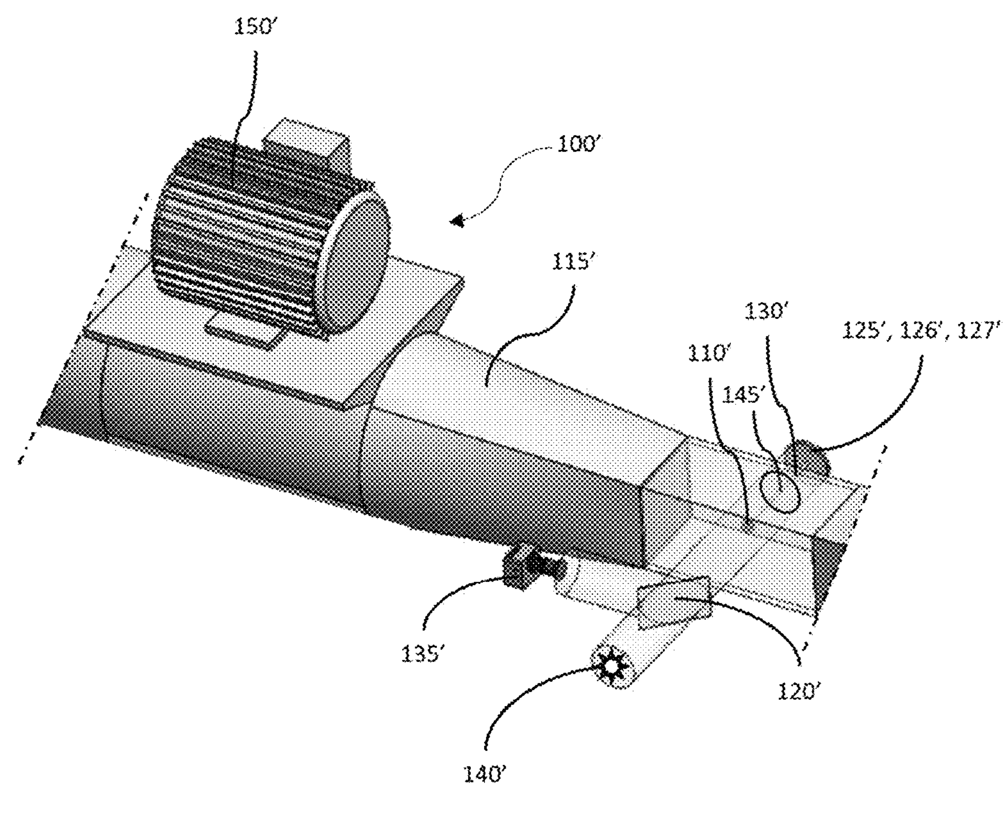
FIG. 1B is a schematic illustration of a golf ball aerodynamic analysis assembly according to another aspect.

In another aspect, FIG. 1B illustrates another golf ball aerodynamic analysis assembly 100', which is similar to the golf ball aerodynamic analysis assembly 100 of FIG. 1A, and functions in a similar manner to the golf ball aerodynamic analysis assembly 100 of FIG. 1A, except for the foregoing differences and unless explicitly described to the contrary below. Similar elements between FIGS. 1A and 1B are indicated via similar reference numerals, i.e., 100 and 100' for the golf ball aerodynamic analysis assembly. Certain elements not explicitly illustrated in FIG. 1A can be included with the assembly shown in FIG. 1B, and vice versa.

As shown in FIG. 1B, a golf ball 110' is positioned within a wind tunnel 115' via a support 130'. A golf ball heating and rotation assembly, which can include a heater 125', a motor 126', and a power source or battery 127', can be connected to the support 130'. An imaging and light source assembly, which can include a mirror 120', a camera 135', a light source 140', and a spherical mirror 145', can also be provided in order to obtain images of the golf ball 110'.

An air flow generator 150' can also be provided. As shown in FIG. 1B, a motor for the air flow generator 150' can be mounted externally relative to the inside of the wind tunnel 115'. One of ordinary skill in the art would understand that the specific arrangement or mounting configuration of the air flow generator 150' can vary.

In one aspect, the mirror 120' is a half-silvered mirror, one-way mirror, or semi-transparent mirror. As shown in FIG. 1B, the light source 140' can be configured to direct light through the mirror 120' and towards the golf ball 110'. The mirror 120' can be arranged at an angle relative to the camera 135', which in one aspect can be 45 degrees. In another aspect, the mirror 120' can be arranged at an angle of 30 degrees-60 degrees relative to the camera 135'. One of ordinary skill in the art would appreciate from the present disclosure that the exact positioning of the mirror 120' and the camera 135' can vary. In one aspect, the spherical mirror 145' includes a hole for the support 130' to pass through. The spherical mirror 145' can be flush with the test section, effectively incorporated into the test section sidewall, or it can be positioned outside the test section. A monitor, such as monitor 155, and/or a computer, such as computer 156, can further be configured to interface with the camera 135' or any other element in FIG. 1B.

Figure 2A:
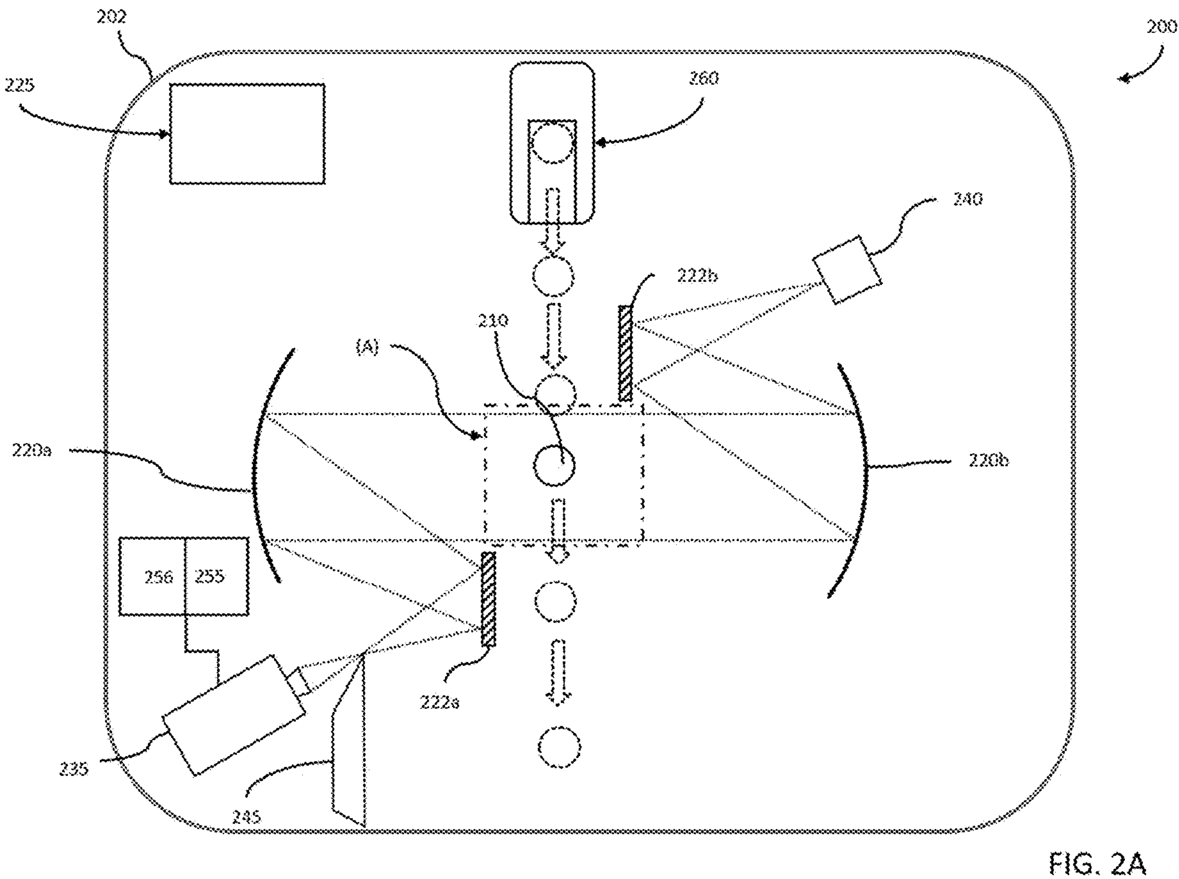
FIG. 2A is a schematic illustration of a golf ball aerodynamic analysis assembly according to another aspect.

FIG. 2A illustrates a second golf ball aerodynamic analysis assembly 200 (hereinafter "assembly 200"). Similar to the configuration shown in FIGS. 1A and 1B, the assembly 200 shown in FIG. 2A includes a camera 235, a light source 240, a knife edge 245, a monitor 255, and a computer 256. A housing 202 can also be provided for supporting the components of the assembly 200.

Instead of a single mirror, the assembly 200 includes a plurality of mirrors. In proximity to the camera 235 and the knife edge 245, a first parabolic mirror 220*a* and a first flat mirror 222*a* are provided. In proximity to the light source 240, a second parabolic mirror 220*b* and a second flat mirror 222*b* are provided. Based on the relative positioning of the mirrors, light from the light source 240 is directed towards the knife edge 245 and the camera 235.

A test area (A) can be defined in a relative medial area between the two mirrors 220*a*, 220*b* as shown in FIG. 2A. A golf ball launcher 260 is provided that is configured to launch a golf ball 210 through the test area (A). The golf ball launcher 260 can be configured to impart a rotational force onto the golf ball 210 while also launching the golf ball 210. The golf ball launcher 260 can be configured to impart speed and spin on the golf ball 210. In one configuration, the golf ball launcher 260 can launch the golf ball 210 at 150 mph-200 mph or greater. The speed and rotational force imparted onto the golf ball 210 can be adjusted. In one aspect, the golf ball 210 is rotated such that the top surface of the golf ball is moving in an opposite direction as the dashed arrows shown in FIG. 2A. The golf ball 210 can be configured to spin counterclockwise as viewed by the image capturing device or camera 235.

The camera 235 can be a digital high-speed camera. In one example, the camera 235 can capture images or video, and have a frame rate of at least 4,000 frames per second and a shutter time of less than 25 microseconds. One of ordinary skill in the art would understand based on this disclosure that a shorter shutter time can be used, and a higher frame rate can be used.

In one aspect, the camera frame rate f can be determined by:

$$f = \frac{(N+1)v}{FOV}$$

where N is the number of images per frame, v is the relative speed of the air relative to the surface of the golf ball, and FOV is the field of view of the camera.

A heating assembly 225 is also provided that is configured to heat the golf ball 210. The heating assembly 225 can be an oven, in one example. In one example, the golf ball 210 is configured to be heated in the oven for at least 5 minutes at 350° F. In one configuration, a heated clamping ring can be configured to attach to the golf ball 210 prior to being loaded into the golf ball launcher 260. The heated clamping ring can be configured to wrap around an equator of the golf ball 210 and heat the equator of the golf ball 210. In another configuration, a heated clamping ring can be configured to be disposed or wrapped around the equator of the golf ball 210 and the golf ball 210 can be launched via the golf ball launcher 260 with the heated clamping ring attached to the golf ball 210. One of ordinary skill in the art would understand that the heated clamping ring can also be positioned along a small circle of the golf ball.

In one configuration, a sensor assembly can be provided that is configured to detect the presence of the golf ball as it travels through the test area. For example, a sensor can be configured to trigger the camera 235 to start recording as the golf ball approaches the field of view of the camera 235. This arrangement can be configured based on known values, such as the size of the field of view, the golf ball speed, etc. This arrangement provides an efficiency for the user in that the user can more quickly identify the captured frames of interest (i.e., when the golf ball is in the field of view).

Figure 2B:
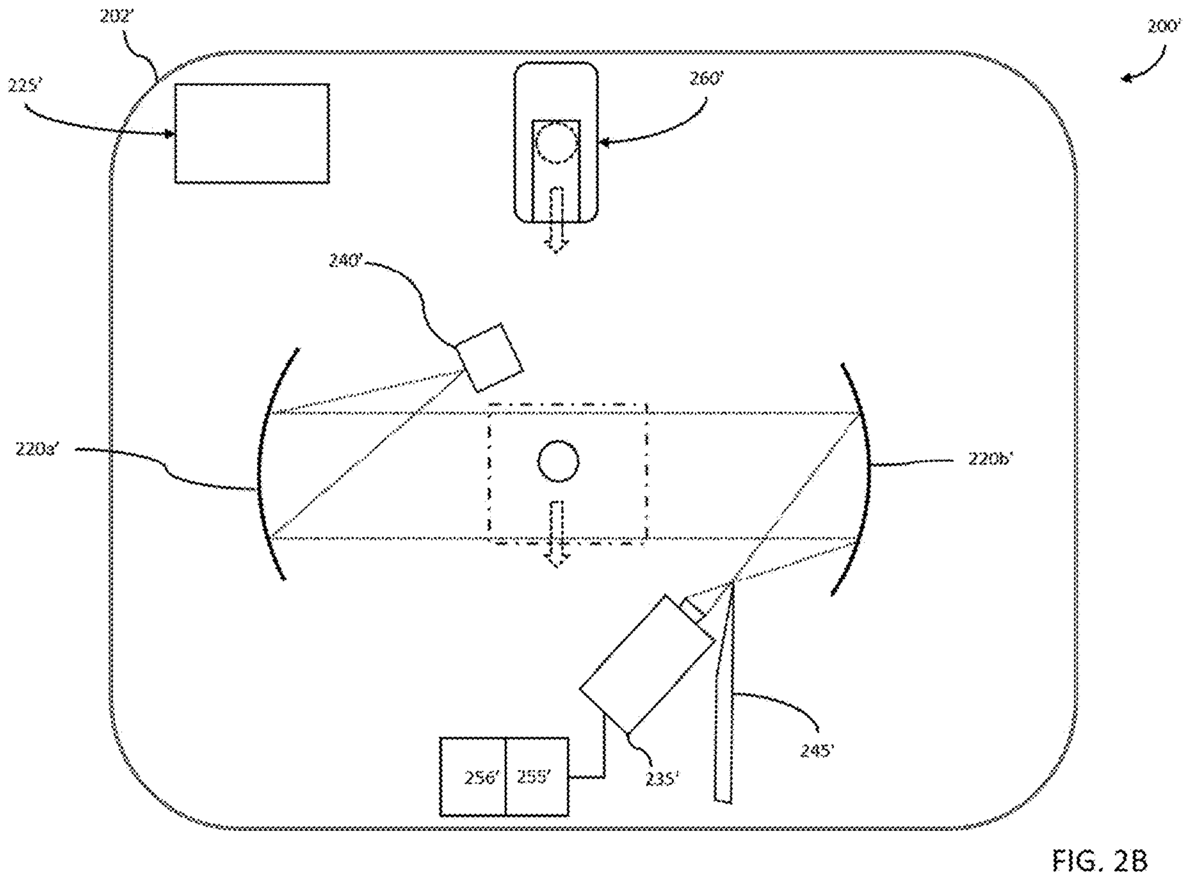
FIG. 2B is another schematic illustration of a golf ball aerodynamic analysis assembly.

FIG. 2B illustrates a similar system 200' as shown in FIG. 2A except for a modification of the mirror configuration. All of the components shown in FIG. 2B are functionally and substantially the same as the components of FIG. 2A unless specified otherwise. A prime (') annotation is added to the similar or like components from FIG. 2A to FIG. 2B. As shown in FIG. 2B, only a single pair of mirrors 220*a*', 220*b*' are included as opposed to the additional mirrors 222*a*, 222*b* in FIG. 2A. The mirrors 220*a*', 220*b*' can be parabolic mirrors. One of ordinary skill in the art would understand that the position and configuration of the mirrors can be modified depending on the specific requirements of an arrangement.

In one aspect, as shown in FIGS. 2A and 2B, the systems 200, 200' can provide in-flight aerodynamic analysis of a golf ball. The systems 200, 200' of FIGS. 2A and 2B explicitly do not require a wind tunnel and do not require holding the golf ball at a fixed location in order to analyze the aerodynamic characteristics of the golf ball.

Figure 3A:
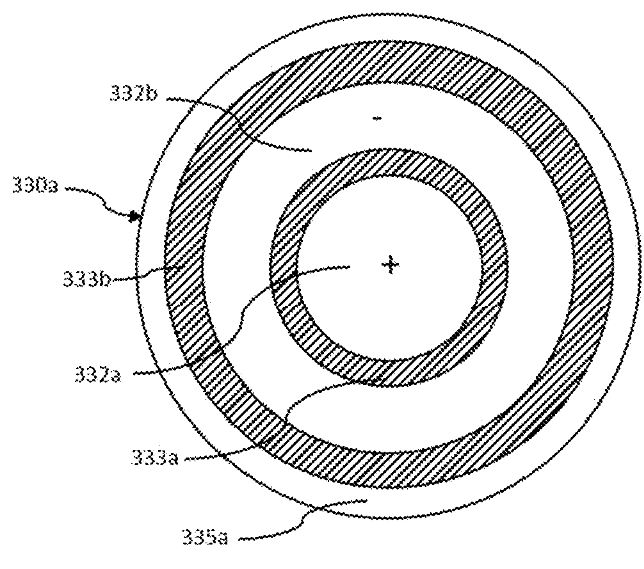
FIG. 3A is a cross-sectional view of a first golf ball support for a golf ball aerodynamic analysis assembly.
Figure 3B:
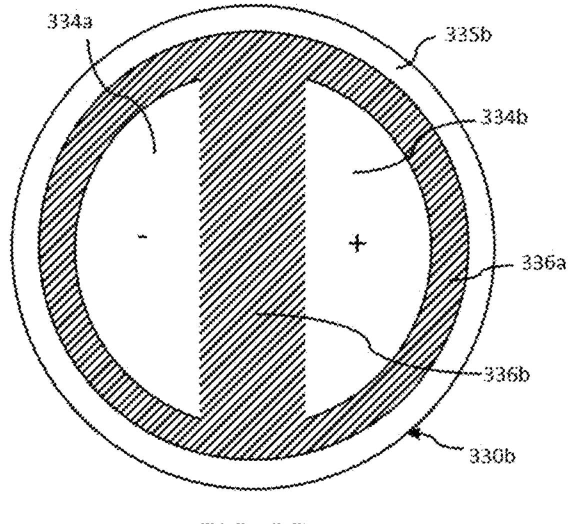
FIG. 3B is a cross-sectional view of a second golf ball support for a golf ball aerodynamic analysis assembly.

Referring to FIGS. 3A and 3B, two exemplary configurations for the shaft 330*a*, 330*b* for supporting the golf ball are shown. As shown in FIG. 3A, the shaft 330*a* can include an outer body 335*a* with internal heating elements, such as a positive heating element or wire 332*a* and a negative heating element or wire 332*b*. In one aspect, these heating elements are arranged concentrically with each other. Insulation layers or materials 333*a*, 333*b* can be arranged between each of the positive heating element or wire 332*a*, the negative heating element or wire 332*b*, and the outer body 335*a*.

In another example, as shown in FIG. 3B, the positive heating element or wire 334*a* and the negative heating element or wire 334*b* can be arranged diametrically opposite from each other within the outer body 335*b*. Insulation layers or materials 336*a*, 336*b* can be arranged between the positive heating element or wire 334*a* and the negative heating element or wire 334*b*, as well as the positive heating element or wire 334*a* and the negative heating element or wire 334*b* and the outer body 335*b*. Various configurations for the support or shaft for holding the golf ball can be used. The shafts 330*a*, 330*b* can be integrally formed with the golf ball, in one aspect, such that a core of the golf ball includes the heating elements of the shafts 330*a*, 330*b*.

Figure 4:
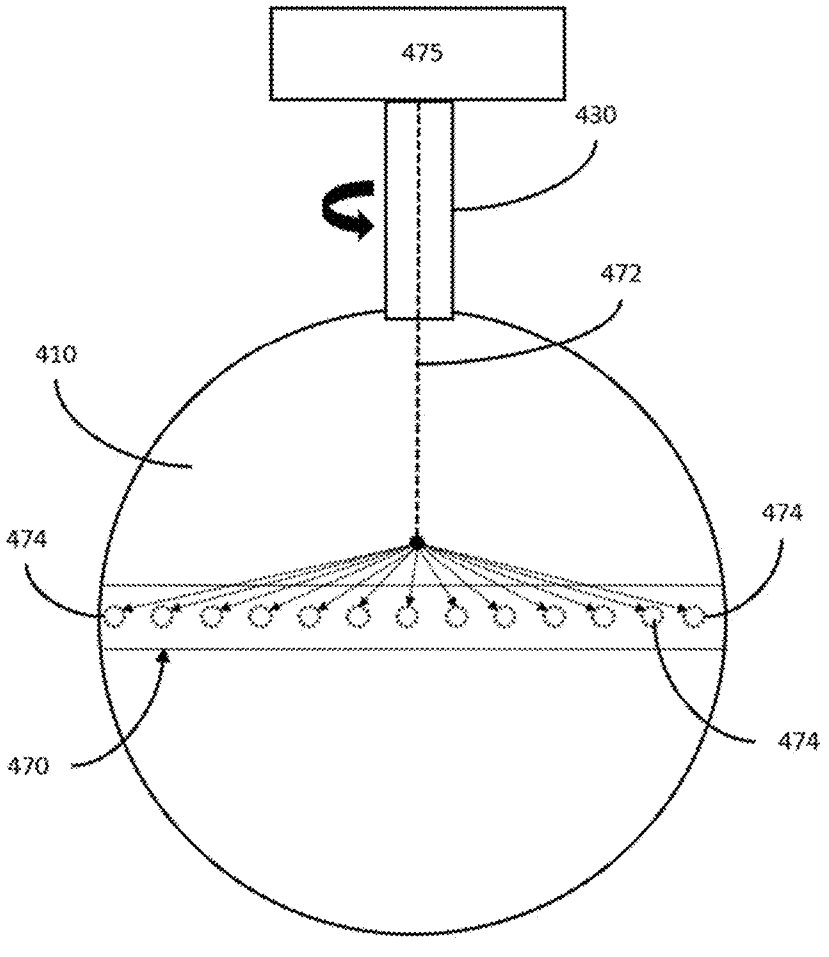
FIG. 4 is an illustration of a golf ball, a golf ball support, and a fluid dispersion assembly according to one aspect.

Referring to FIG. 4, the golf ball 410 can be supported via a support 430. A fluid dispersion assembly 470 can be provided. The fluid dispersion assembly 470 can be integrated with the golf ball 410 or wrapped around the golf ball 410, in some exemplary arrangements. One of ordinary skill in the art would understand that other configurations could be used. A conduit 472 is provided between a plurality of openings 474 and a fluid source 475. The fluid source 475 can be configured to pump or otherwise direct fluid from the fluid source 475 through the conduit 472 and to the openings 474 such that a fluid is released from the fluid dispersion assembly 470. The openings 474 can be covered by a porous material, such as sintered metal, to maintain continuity of the golf ball's outer surface while allowing a gas or liquid to pass through.

Figure 5:
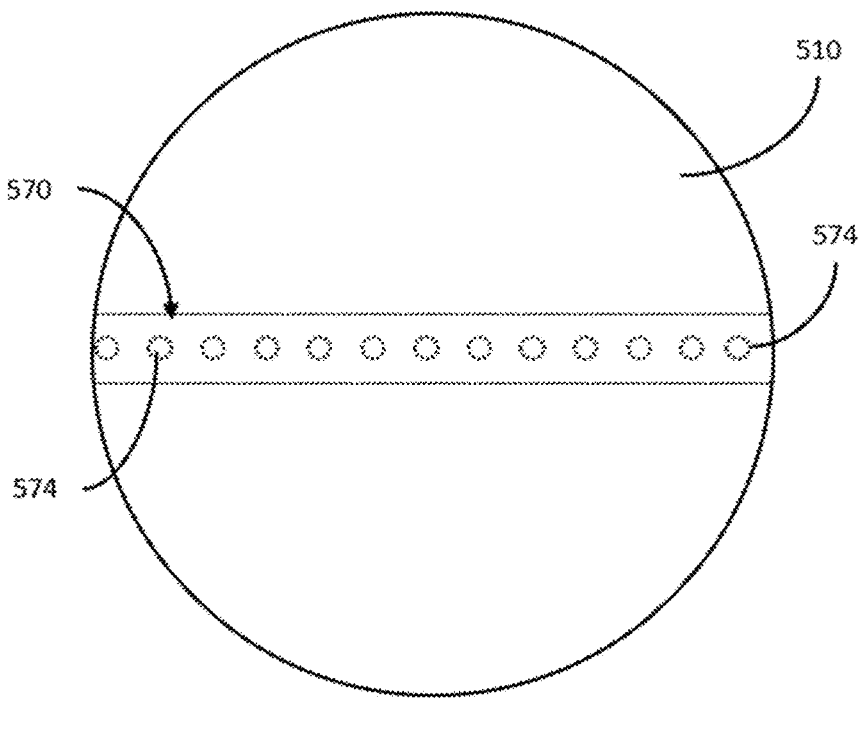
FIG. 5 is an illustration of a golf ball and a fluid dispersion assembly according to another aspect.

Referring to FIG. 5, another type of fluid dispersion assembly 570 is provided that lacks any external fluid source. Instead, the fluid dispersion assembly 570 has an internal reservoir of fluid that is configured to be released, seep, or otherwise exit the plurality of openings 574. The openings 574 can be dimensioned such that the fluid is released at a predetermined rate. Rotation of the golf ball 510 can be controlled and can be configured to fling or centrifugally drive fluid outward from the golf ball 510.

Figure 6:
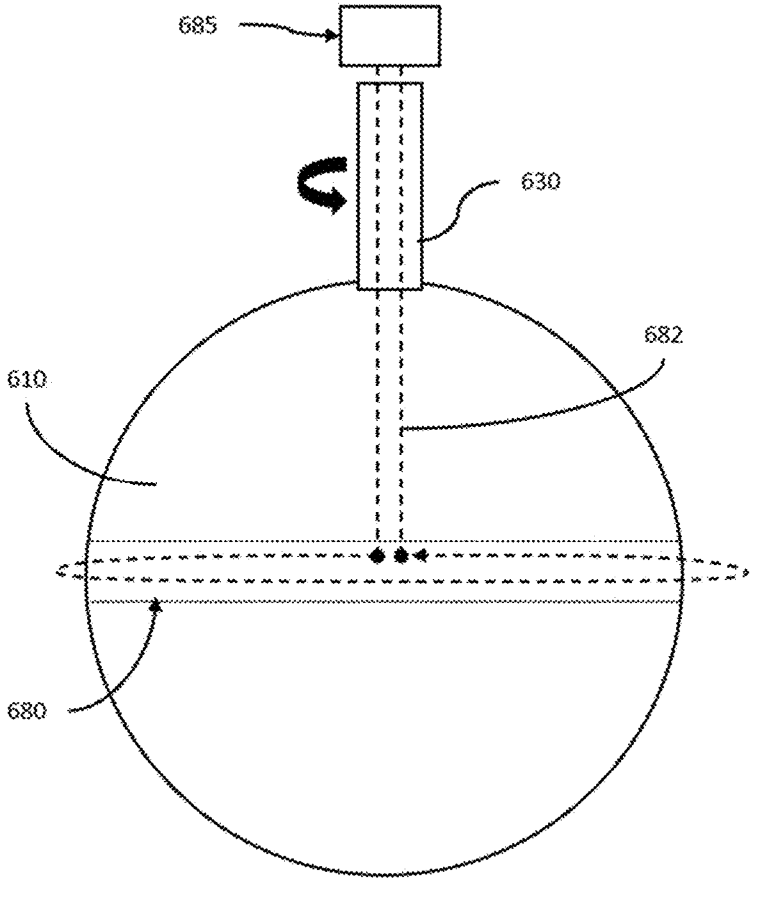
FIG. 6 is an illustration of a golf ball, a golf ball support, and a heating assembly according to one aspect.

Referring to FIG. 6, a configuration is shown in which the golf ball 610 can be heated. As shown in FIG. 6, the heating assembly 680 can be integrated within the golf ball 610. For example, a power source 685 for the heater can be connected to a heating circuit 682 arranged to wrap around an equatorial region of the golf ball 610. The heating circuit 682 can extend through a support 630 that is configured to hold the golf ball 610.

Figure 7:
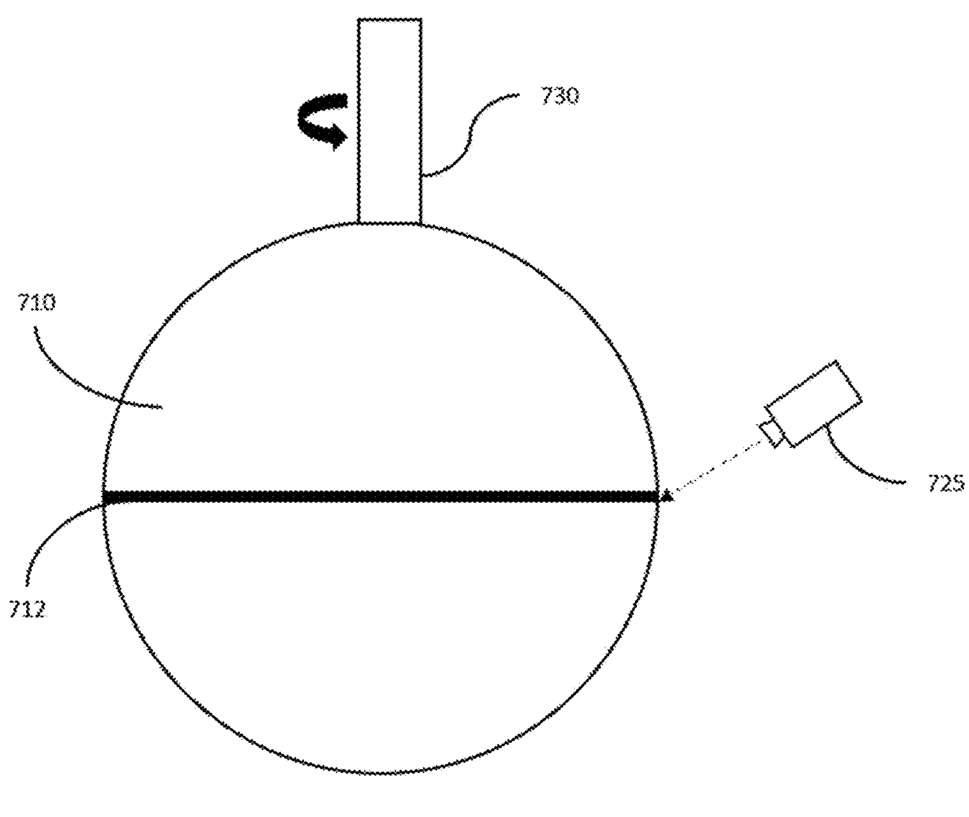
FIG. 7 is an illustration of a golf ball, a golf ball support, and a heating assembly according to another aspect.

As shown in FIG. 7, another configuration is provided in which the golf ball 710 is mounted to the support 730. A strip 712 can be provided around an equatorial portion of the golf ball 710 or a great circle of the golf ball 710 that is configured to absorb radiating heat or energy from a heating unit 725. The strip 712 can be a different color than the golf ball and can be specifically configured to absorb more thermal energy than the golf ball itself. In one example, the strip 712 is relatively thin and no larger than 10.0 mm. In one example, the heating unit 725 can be a heat gun, such as an infrared focused source or laser, or visible light focused source or ultraviolet focused source. The heating unit 725 can be positioned outside of the wind tunnel and can be directed at the golf ball 710 via a window, such as window 115*c*. The heating unit 725 can be arranged between 2 inches-6 inches from the golf ball. The strip 712 can be formed from metallic ink, in one aspect. In another aspect, a centered disk formed from a highly conductive material can be integrally formed with the golf ball such that the centered disk is sandwiched between two spherical cap portions of the golf ball. The disk can be configured to receive current and be heated, such that the golf ball is heated.

In another embodiment, a series of schlieren images can be acquired and then analyzed collectively. The series of images can be acquired along various planes parallel to a direction of airflow provided by the schlieren system, wherein the characteristic length of the object under observation is defined as "L" (e.g., for a golf ball, "L" is the golf ball's diameter), the collection of planes may be up to 2L nearer the camera or up to 2L farther from the camera than the plane containing the centroid of the object under observation (e.g., for a golf ball this plane would be coincident with the great circle of the golf ball). Using this data, multiple slices of data can be collected and can be used to generate a three-dimensional map for the full flow field around the object. One of ordinary skill in the art would understand based on this disclosure that various other imaging techniques could be used in conjunction with taking a series of images acquired along various planes of the object.

Figure 8:
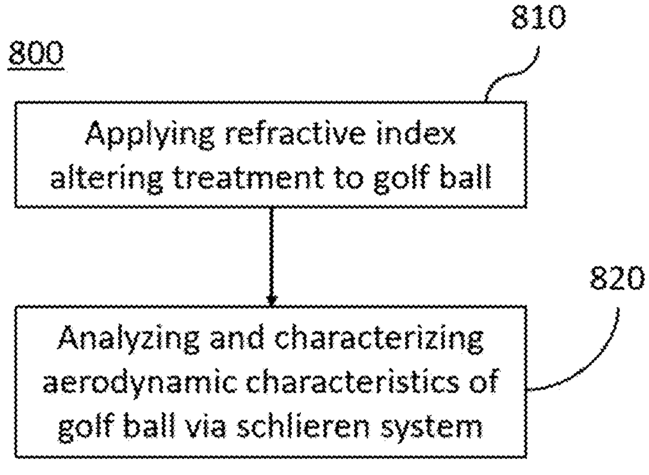
FIG. 8 is a flowchart illustrating one method of analyzing golf ball aerodynamic characteristics.
Figure 9:
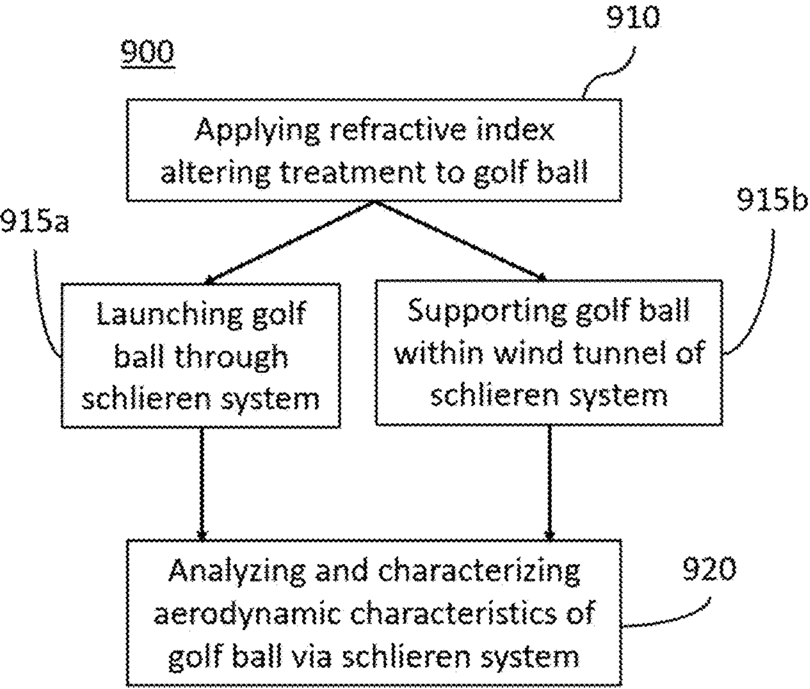
FIG. 9 is a flowchart illustrating another method of analyzing golf ball aerodynamic characteristics.

FIGS. 8 and 9 illustrate exemplary flowcharts showing steps for methods of analyzing and characterizing aerodynamic characteristics of a golf ball. FIG. 8 illustrates a method 800 of analyzing and characterizing aerodynamic characteristics of a golf ball. The method 800 can comprise applying a refractive index altering treatment to a golf ball such that a non-homogenous density-altering effect is emitted from the golf ball (step 810). The method 800 can further comprise analyzing and characterizing aerodynamic characteristics of the golf ball, such as via a schlieren system (step 820).

FIG. 9 illustrates another method 900 of analyzing and characterizing aerodynamic characteristics of a golf ball. The method 900 can comprise applying a refractive index altering treatment to a golf ball via at least one of: applying a heat treatment to the golf ball, or providing a fluid dispersion assembly to the golf ball, such that a non-homogenous density-altering effect is emitted from the golf ball (step 910). The method can further comprise either: launching the golf ball through a schlieren system (step 915*a*), or supporting the golf ball via at least one support within a wind tunnel of a schlieren system (step 915*b*). The method can comprise analyzing and characterizing aerodynamic characteristics of the golf ball based on visual data obtained from the schlieren system (step 920).

Figure 10:
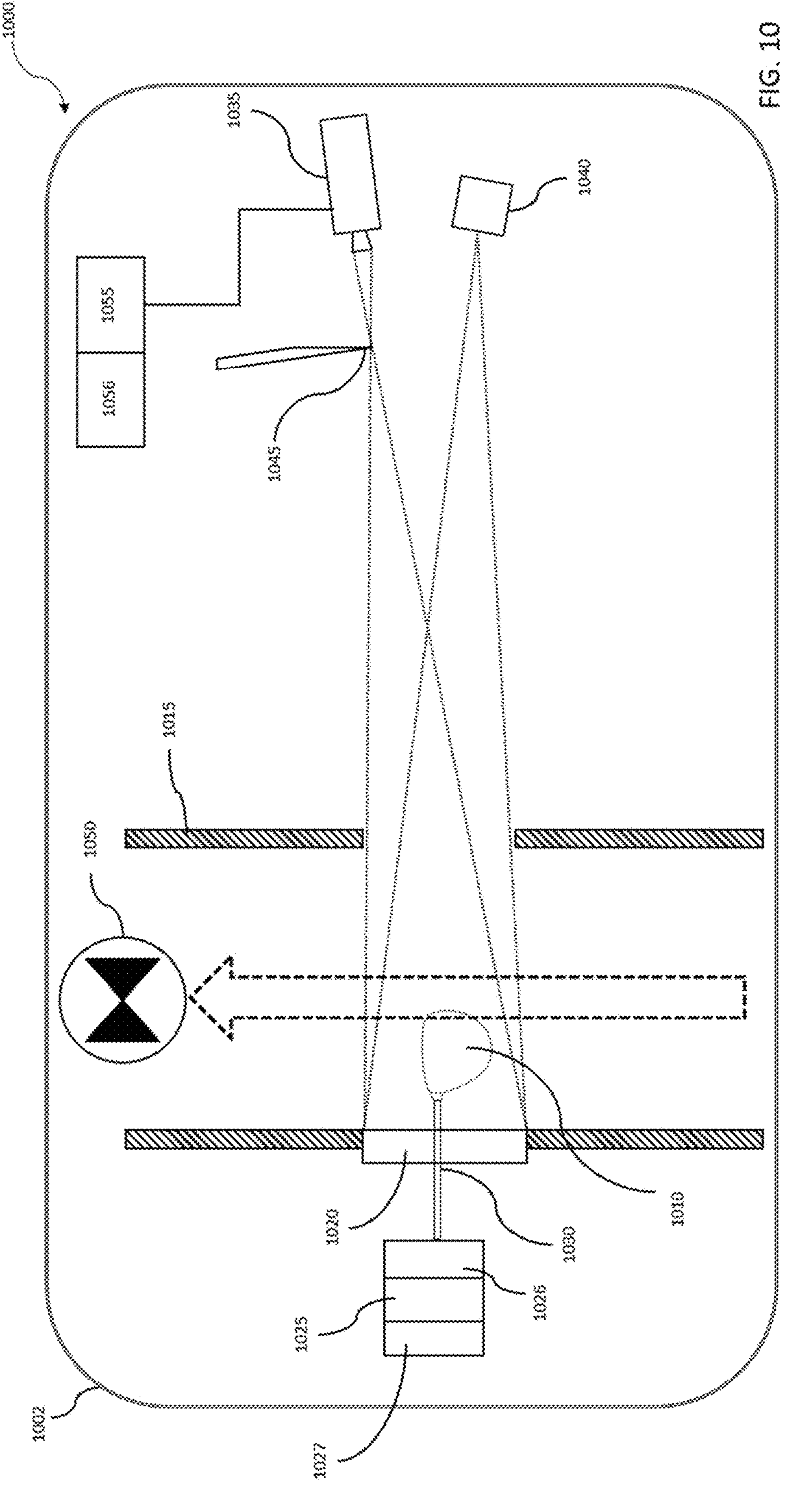
FIG. 10 is a schematic illustration of a golf club aerodynamic analysis assembly according to one aspect.

FIG. 10 illustrates another assembly 1000 which is relatively similar to the assembly 100 shown in FIGS. 1A and 1B. As shown in FIG. 10, a golf club head 1010 is arranged within the assembly 1000 and is disposed such that the aerodynamic features of the golf club head 1010 can be analyzed. All of the other components of the assembly 1000 use similar reference numerals as used for the components in the assembly 100 and otherwise function in the same manner as described above. The support 1030 can be configured to hold the golf club head 1010 stationary within the wind tunnel 1015. The support 1030 can further be configured to heat the golf club head 1010 such that a non-homogenous density-altering effect is emitted from the golf club head 1010. The assembly 1000 also includes a housing 1002, mirror 1020, heater 1025, motor 1026, battery 1027, camera 1035, light source 1040, knife edge 1045, air flow generator 1050, monitor 1055, and computer 1056.

The assembly 1000 operates in the same manner as the assembly 100, or any of the other assemblies disclosed herein, and is configured to provide qualitative and quantitative information regarding aerodynamic characteristics of the golf club head 1010. Although the golf club head 1010 is shown in one orientation in FIG. 10, one of ordinary skill in the art would recognize that the golf club head can be oriented in a variety of positions relative to the direction of air flow in the wind tunnel 1015. Additionally, the golf club head 1010 can be configured to move within the wind tunnel 1015 based on the support 1030 moving the golf club head 1010. In one example, the support 1030 can be configured to swing the golf club head 1010 while positioned within the wind tunnel 1015.

In one aspect, a series of images of the golf club head 1010 can be acquired and analyzed collectively. The series of images can be acquired along various planes parallel to a direction of airflow provided by the schlieren system, wherein the characteristic length of the golf club head under observation is defined as "L" (e.g., for parallel observation of a golf club head, "L" is the maximum distance from the club face to the back of the golf club), the collection of planes may be up to 2L nearer the camera or up to 2L farther from the camera than the plane containing the geometric centroid of the object under observation (e.g., for a golf club head this plane would be approximately halfway between the heel and toe of the golf club head). Using this data, multiple slices of data can be collected and can be used to generate a three-dimensional map for the full flow field around the golf club head. One of ordinary skill in the art would understand based on this disclosure that various other imaging techniques could be used in conjunction with taking a series of images acquired along various planes of the object.

Figure 11B:
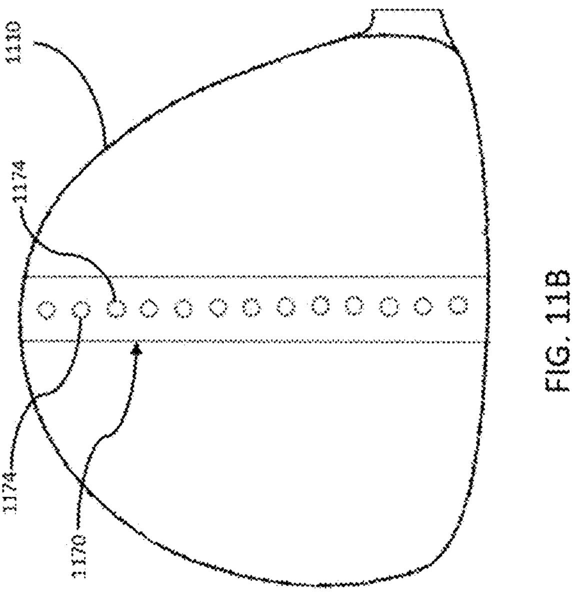
FIG. 11B is an illustration of a golf club and a fluid dispersion assembly according to another aspect.
Figure 11A:
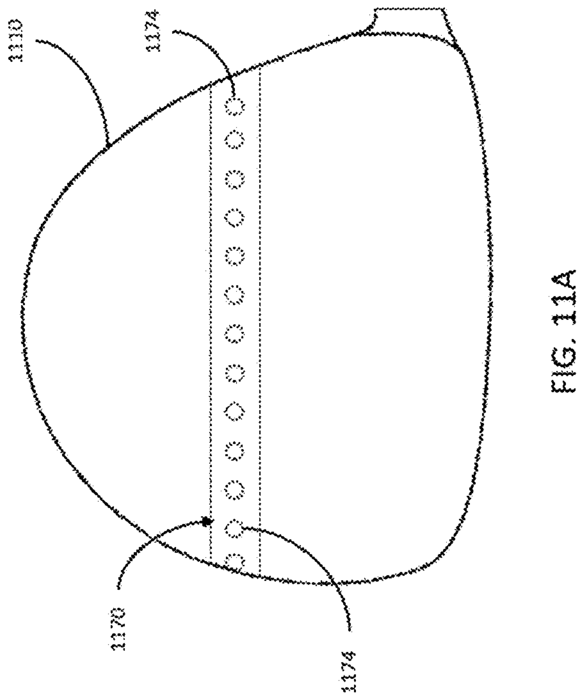
FIG. 11A is an illustration of a golf club and a fluid dispersion assembly according to another aspect.

Referring to FIGS. 11A and 11B, another type of fluid dispersion assembly 1170 is provided that is configured to be disposed on a golf club head 1110. This fluid dispersion assembly 1170 is similar to the fluid dispersion assembly 570, and includes an internal reservoir of fluid that is configured to be released, seep, or otherwise exit the plurality of openings 1174. The openings 1174 can be dimensioned such that the fluid is released at a predetermined rate. As shown in FIG. 11A, the fluid dispersion assembly 1170 can be arranged parallel to the club face. As shown in FIG. 11B, the fluid dispersion assembly 1170 can be arranged perpendicular to the club face. One of ordinary skill in the art would recognize from this disclosure that various configurations and orientations can be used for the fluid dispersion assembly. In one aspect, the fluid dispersion assembly 1170 can be arranged both parallel to the club face and perpendicular to the club face. Although the golf club head 1110 is illustrated as a driver head or fairway head, one of ordinary skill in the art would understand that the golf club head 1110 can be a golf club head for an iron, wedge, or any other golf club.

One of ordinary skill in the art would recognize based on this disclosure that various types of fluid dispersion assemblies could be disposed on or integrated with the golf club head 1110. The golf club head 1110 can then be configured to be arranged within a wind tunnel, such as wind tunnel 1015. Using the configurations disclosed herein, aerodynamic information regarding the golf club heads can be collected using subsonic speeds of airflow and a schlieren system.

In one aspect, the present disclosure can be adapted to be used to measure and visualize air flow over various golf equipment, such as golf club heads and shafts, as well as users' hands, arms, etc., throughout swinging a golf club and impact with a golf ball. Accordingly, the present disclosure can provide a useful configuration for comparing the aerodynamics of golf club shapes and designs.

In one aspect, a system for analyzing the aerodynamics of a golf ball is disclosed herein. The system can include a schlieren assembly, which can be arranged in various configurations, such as shown in FIG. 1A, 1B, 2A or 2B. The system can include a support for holding a golf ball within a wind tunnel, or the system can include a golf ball launcher configured to launch a golf ball through a test area (A) of the schlieren assembly. Regardless of the configuration, the golf ball can be treated or undergo a modification prior to the analysis. In one aspect, the system includes a fluid dispersion assembly that is configured to wrap around the golf ball and emit a substance or fluid that is detected by the schlieren assembly. In another aspect, the system includes a heating component, which can be an oven, a heat gun, a conductive heating unit, heated clamping ring, or other heating apparatus. The heat may affect the full surface area of the golf ball or may affect a localized region. The method of heat application may be internal to the golf ball or external to the golf ball.

In one aspect, the system includes a support for holding and rotating a golf ball within a wind tunnel as shown in FIGS. 1A and 1B, and the rotating speed of the motor 126, 126' and the air flow speed of the air flow generator 150, 150' can be controlled to produce a variety of relative air speeds over the golf ball and a variety of golf ball rotational speeds. As shown in FIG. 1A, a controller 152 or other control element (such as a dual output AC or DC motor speed controller) can be provided that is configured to interface between the motors for both the motor configured to rotate or otherwise move the golf ball (i.e., motor 126), and also the motor configured to control the air speed within the wind tunnel (i.e., the motor associated with the air flow generator 150). By synchronously changing both the air flow speed and rotating speed of the golf ball, the present disclosure is configured to simulate the flight conditions of the golf ball over its complete trajectory or flight pattern while simultaneously capturing a series of images that visualize the aerodynamic behavior of the flow throughout the duration of the simulated flight. This visual data can be processed and used to characterize the golf ball's aerodynamic performance including, but not limited to, the instantaneous shape of the wake, angle of inclination of the wake, length of the wake, and/or magnitude and/or frequency of vortex shedding, as well as enabling the evaluation of the dynamic evolution of the aerodynamic characteristics over the course of flight. A video can be generated for any golf ball that is comprised of a series of images representative of the golf ball's simulated flight. The present disclosure is thereby configured to provide analysis of a variety of types of shots that a golfer could create, including shots that would be created with a variety of golf clubs (i.e., with wedges, irons, and metals) that generate different launch speeds and spins, in different atmospheric conditions (i.e., wind), and various other real-world situations for golf balls during the entire course of flight. In one aspect, the controller (or an associated computer or electronic component, memory unit, etc.) can be pre-programmed or configured to be execute a plurality of shot type simulations. For example, the controller can be configured to execute or send input signals to the respective motors associated with various flight and striking conditions for a driver, 3-wood, 5-wood, hybrid club, 9-iron, 8-iron, 7-iron, 6-iron, 5-iron, 4-iron, 3-iron, pitching wedge, gap wedge, sand wedge, and/or various other clubs. Settings for wind speeds, rotational speeds, and other flight related parameters can be stored in a computer configured to send and receive data and commands with the controller. Accordingly, a user can analyze the aerodynamic characteristics of a specific golf ball relative to a full spectrum of golf clubs using the features of the present disclosure.

When used for analyzing a golf club head instead of a golf ball, the present application likewise provides the ability to analyze air flow relative to the golf club head throughout the entire swing via adjusting the motors associated with moving or controlling the position of the golf club head and the motor of the air flow generator. One of ordinary skill in the art understands that a wide variety of golf club maximum speeds can be analyzed with the disclosed methodology, emulating a wide range of swing speeds.

Figure 13:
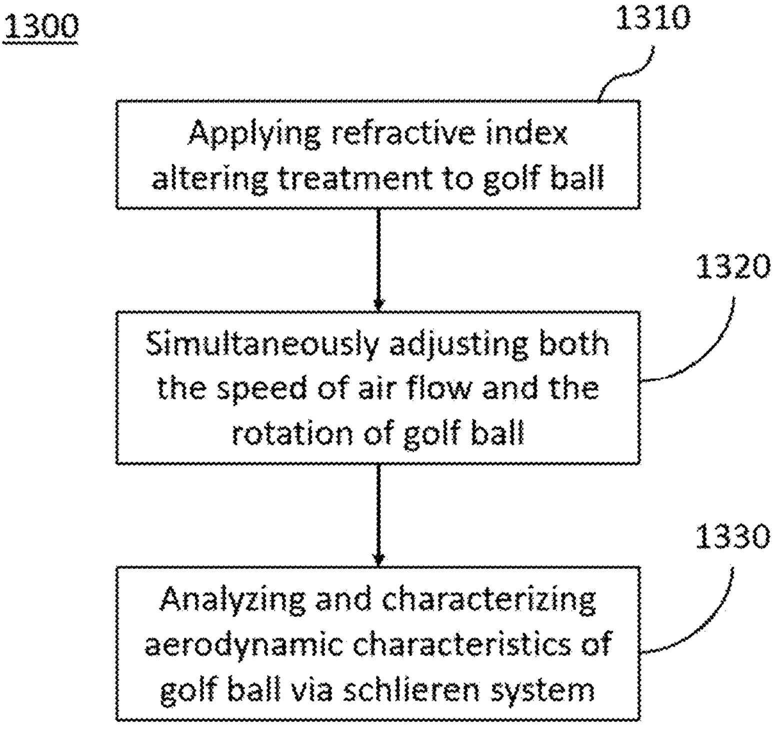
FIG. 13 is a flowchart illustrating another method of analyzing golf ball aerodynamic characteristics.

As shown in FIG. 13, another method 1300 of analyzing and characterizing aerodynamic characteristics of a golf ball is provided. The method 1300 can comprise applying a refractive index altering treatment to a golf ball such that a non-homogenous density-altering effect is emitted from the golf ball (step 1310). The method 1300 can further comprise adjusting a rotational speed of the golf ball and adjusting a wind speed for an air flow generator via a controller such that variable conditions are generated for a simulated golf ball flight (step 1320). Step 1320 can include simultaneously rotating the golf ball and also adjusting the speed of an air flow directed towards the golf ball. Step 1320 effectively provides the ability to analyze the aerodynamic conditions that are experienced by a golf ball over the entirety of a simulated flight. For instance, the air flow speed can start at 0 mph and quickly increase to a peak air flow speed to simulate a golf ball that has just been struck, and then gradually lower until settling back to 0 mph as the simulated flight ends. Likewise, the rotation of the golf ball can start at 0 rpm, then quickly accelerate to a peak rotational speed before gradually lowering as the simulated flight ends. The method 1300 can further comprise analyzing and characterizing aerodynamic characteristics of the golf ball via a schlieren system (step 1330).

The system does not require any sonic or supersonic fluid flow or analysis, and instead relies on a pre-treatment of the golf ball to provide some detectable alteration, such as a density or refractive differential. Various other components can be included in the system, as one of ordinary skill in the art would appreciate based on the present disclosure.

Based on the visual data captured by the camera, the present disclosure allows a user to quantitively and qualitatively analyze the visual data to determine the characteristics of the aerodynamic profile of the golf ball. One of ordinary skill in the art would understand that the visual data from the camera can be transmitted to a processor, computer, or other electronic computing element that is configured to process, analyze, store, or otherwise handle the visual data. The visual data can be processed to determine lift and drag coefficients, for example.

The present disclosure provides users with the ability to qualitatively review various aerodynamic profiles for golf balls, such as via providing side-by-side or superimposed images of two different golf ball aerodynamic profiles. One of ordinary skill in the art would understand that a monitor or display can be connected to a computer or processor that is configured to analyze the visual data. In one aspect, the present disclosure provides an arrangement and method which aids in the analysis and characterization of aerodynamic properties of objects. For example, the present disclosure can provide an arrangement in which characteristics, such as the general shape of the wake, angle of inclination of the wake, length of the wake, and/or magnitude and/or frequency of vortex shedding, can be accurately captured via a camera and further analyzed or processed. Imaging software, algorithms, and other image processing techniques can be used to process the data and information captured by the system and provide quantitative and/or qualitative feedback regarding the aerodynamic performance of golf balls.

In one aspect, additional real world simulation features can be provided within the assemblies, such as water spraying, misting, or humidifying elements, ambient air heaters or coolers, and the like. These features can be adjusted to simulate varying real-world conditions for golf ball use, such as hot or cold weather, rainy conditions, humidity variations, etc. In one aspect, additional air flow generator elements can be provided along a longitudinal or axial wall of the wind tunnel to simulate varying wind conditions, such as crosswinds. Accordingly, a more realistic model for golf ball aerodynamic performance can be achieved.

One processing technique includes applying image subtraction to a series of acquired images to remove the common background, thereby subtracting an image of the field of view of the schlieren system without a golf ball from the series containing a golf ball to enhance the contrast and clarity of the images. Exemplary images associated with an image subtraction technique are illustrated by an original image shown in FIG. 12A, and the same image from FIG. 12A after having undergone image subtraction processing as shown in FIG. 12B. These images are presented as an exemplary image processing technique which can be used to improve clarity, reduce noise, or otherwise improve the quality of the image obtained by the methods and systems disclosed herein. One of ordinary skill in the art would understand based on this disclosure that various other image processing techniques can be used. Further image processing techniques could include measuring the length, width, or other dimensions and/or characteristics of the wake generated along the trailing edge the golf ball, for example.

Figure 12A:
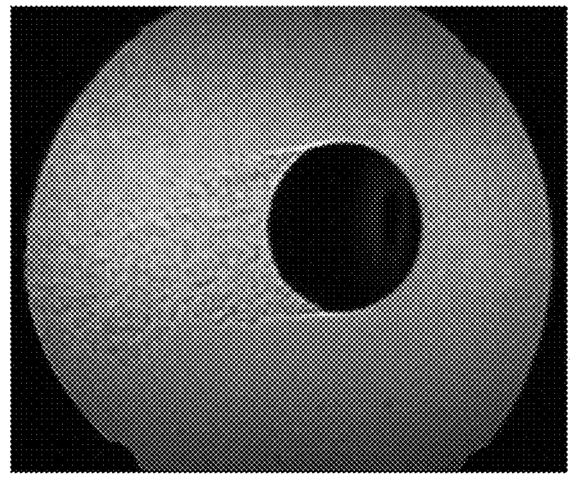
FIG. 12A is an exemplary image of a golf ball according to one aspect of the present disclosure.
Figure 12B:
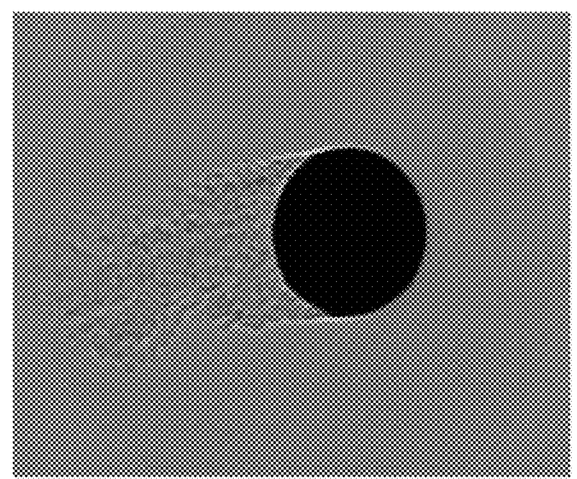
FIG. 12B is the exemplary image of FIG. 12A after applying an image processing technique.

In one aspect, any analyzing and characterizing steps can include analysis of the images, such as the images shown in FIGS. 12A and 12B. Analytical processing techniques can be used to automatically or manually detect relevant information from the images associated with the instantaneous shape of the wake, angle of inclination of the wake, length of the wake, and/or magnitude and/or frequency of vortex shedding, as well as enabling the evaluation of the dynamic evolution of the aerodynamic characteristics over the course of flight. Additionally, the present disclosure provides the ability to characterize the aerodynamic features of the golf balls based on images, such as the ones shown in FIGS. 12A and 12B. One of ordinary skill in the art would understand based on this disclosure that the analysis and characterization of the aerodynamic features of the golf ball can be based on a single image, multiple images, videos, or any other images captured by the camera. The analysis and characterization techniques for the images can include applying various filters, pixel analysis, measurements, magnifications, smoothing, or other known image processing techniques.

Using the images collected by the systems and methods disclosed herein, one of ordinary skill in the art would understand that a machine learning module can be included or integrated with the components such that the collected images from the camera are further analyzed, characterized, or otherwise utilized to provide additional information or data to a user. The machine learning module can be implemented via any of the computers or electronic components disclosed herein. The machine learning module can be configured to automatically identify or characterize various aspects of the aerodynamic features of the object. For example, the machine learning module can be configured to automatically detect or identify aspects such as the shape of the wake, angle of inclination of the wake, length of the wake, and/or magnitude and/or frequency of vortex shedding.

One of ordinary skill in the art would understand based on this disclosure that additional aerodynamic based information could be obtained using the machine learning module. In one configuration, a series of images collected by the system are input into the machine learning module, and a series of data points, annotated images, and/or other information is output by the machine learning module. The machine learning module can be configured to transform series of images into meaningful aerodynamic information regarding the object without additional user input or intervention, in one aspect. This information can be used to provide insight, data, and information that is used to optimize any one or more of: edge angle, surface coverage, dimple layout, the mean and standard deviation of the dimple diameters comprising the pattern, dimple profiles, and/or total dimple volume. One of ordinary skill will understand that this list is non-limiting and may include other relevant design parameters.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A method of characterizing and analyzing aerodynamic characteristics of a golf ball, the method comprising:

(i) applying a refractive index altering treatment to a golf ball such that a non-homogenous density-altering effect is emitted from the golf ball; and (ii) characterizing and analyzing aerodynamic characteristics of the golf ball via a schlieren system.

2. The method according to claim 1, wherein the step of applying the refractive index altering treatment to the golf ball comprises applying a heat treatment to the golf ball.

3. The method according to claim 2, wherein the heat treatment comprises directing a heating element towards a great circle region of the golf ball to heat the golf ball, wherein the great circle region of the golf ball is defined in a plane that is parallel to a direction of airflow provided by the schlieren system.

4. The method according to claim 1, wherein the step of applying the refractive index altering treatment to the golf ball comprises heating the golf ball in a heating unit.

5. The method according to claim 1, wherein the step of applying the refractive index altering treatment to the golf ball comprises disposing a fluid dispersion assembly on the golf ball.

6. The method according to claim 5, wherein the fluid dispersion assembly is arranged around a localized area of the golf ball.

7. The method according to claim 5, wherein the fluid dispersion assembly is configured to disperse at least one of helium, hydrogen, heated air, or alcohol.

8. The method according to claim 1, further comprising launching the golf ball through the schlieren system at a subsonic velocity to characterize and analyze the aerodynamic characteristics of the golf ball.

9. The method according to claim 1, further comprising mounting the golf ball to a support extending into a wind tunnel of the schlieren system.

10. The method according to claim 9, wherein the schlieren system is configured to direct air towards the golf ball at a subsonic velocity.

11. The method according to claim 9, wherein the support comprises a shaft configured to rotate the golf ball.

12. The method according to claim 9, further comprising adjusting a rotational speed of the golf ball and adjusting a wind speed for an air flow generator via a controller such that variable conditions are generated for a simulated golf ball flight.

13. The method according to claim 9, wherein the support includes a heating element configured to heat at least a portion of the golf ball.

14. The method according to claim 9, wherein the support includes a fluid dispersion assembly configured to deliver fluid to at least a portion of the golf ball.

15. The method according to claim 1, wherein the schlieren system comprises:

at least one camera;

at least one light source;

at least one mirror;

at least one of a knife edge, a monochromatic color filter, or a binary colored filter; and at least one of: an air flow generator or a golf ball launcher.

16. The method according to claim 1, wherein step (ii) provides data related to a wake formed behind the golf ball, wherein the data is comprised of at least one of: shape of the wake, angle of inclination of the wake, length of the wake, or vortex shedding.

17. A method of characterizing and analyzing aerodynamic characteristics of a golf ball, the method comprising:

(i) applying a refractive index altering treatment to a golf ball via at least one of:

applying a heat treatment to the golf ball, or providing a fluid dispersion assembly to the golf ball, such that a non-homogenous density-altering effect is emitted from the golf ball;

(ii) either:

(a) launching the golf ball through a schlieren system, or (b) supporting the golf ball via at least one support within a wind tunnel of a schlieren system; and (iii) characterizing and analyzing aerodynamic characteristics of the golf ball based on visual data obtained from the schlieren system.

18. The method according to claim 17, wherein applying the heat treatment to the golf ball includes directing a heating element towards the golf ball.

19. The method according to claim 17, wherein applying the heat treatment to the golf ball comprises integrating a heating element within a shaft of the at least one support configured to hold the golf ball.

20. The method according to claim 17, wherein applying the heat treatment to the golf ball comprises heating the golf ball in a heating unit.

21. The method according to claim 17, wherein the heat treatment is applied to a localized region of the golf ball.

22. The method according to claim 17, wherein providing the fluid dispersion assembly to the golf ball comprises disposing the fluid dispersion assembly around a great circle of the golf ball.

23. The method according to claim 22, wherein the fluid dispersion assembly is configured to disperse at least one of helium, hydrogen, heated air, or alcohol.

24. The method according to claim 17, wherein the heat treatment or the fluid dispersion assembly are configured to be applied to a great circle region of the golf ball, wherein the great circle region of the golf ball is defined in a plane that is parallel to a direction of airflow relative to the golf ball.

25. A method of characterizing and analyzing aerodynamic characteristics of a golf club, the method comprising:

(i) applying a refractive index altering treatment to the golf club such that a non-homogenous density-altering effect is emitted from the golf club; and (ii) characterizing and analyzing aerodynamic characteristics of the golf club via a schlieren system.

* * * * *